United States Patent Office 3,510,312
Patented May 5, 1970

3,510,312
PREPARATION OF STABLE CONCENTRATES OF BAKING FLOURS CONTAINING YEASTS
Heinrich Rupprecht, Tennenlohe, uber Erlangen, and Lorenz Popp, Nuremberg-Buch, Germany, assignors to Bast Hefe- und Spirituswerke G.m.b.H., Nuremberg-Buch, Germany, a corporation of Germany
No Drawing. Filed Aug. 25, 1966, Ser. No. 574,908
Claims priority, application Germany, Oct. 5, 1965, B 83,990
Int. Cl. A21d 2/00; A23l 1/10
U.S. Cl. 99—94
7 Claims

ABSTRACT OF THE DISCLOSURE

Ready-to-use baking mix, and process for its preparation, containing an admixture of fresh yeast and either pre-dried baking flour alone or pre-dried baking flour and pre-dried starch, the mix having an over-all moisture content of 11% to 1% by weight.

PRIOR ART

The steadily increasing tendency to use the dry ready-to-use baking mixes in households as well as in commercial baking plants has effected a continued improvement in regard to quality and stability of these products and considerable progress has been made in this direction, particularly in the field of the so-called "baking-powder cakes." Dry ready-to-bake cake flours are already known which, depending upon the particular recipe, contain all of the ingredients called for in the required proportions so that they are immediately ready to put in the oven after admixing them with the amount of baking liquid indicated. The baked goods obtained from these ready mixes can, as far as it relates to products of top value, hardly be distinguished by the layman in regard to their taste and their pore structure from those baked goods which were prepared in the conventional manner from the individual ingredients.

Attempts to produce satisfactory ready-to-bake cake flours for the so-called "yeast cakes" have not been very successful. Either the user is supplied with powdery mixtures to which fresh yeast, the essential ingredient, has to be added and, therefore, are not true "ready-to-mix cake flours," or dry yeast is supplied in separate bags in the retail package. This, however, is not an ideal procedure since working with dry yeasts is complicated and their taste does not conform to that of fresh yeast.

The problem is that under standard conditions of storage, fresh yeast as a natural organism remains usable for approximately only 14 days after which time it loses to a considerable extent its activating power and its taste. Therefore, numerous processes to stabilize yeast have been suggested. For instance, dehydrating or water absorbing agents, such as calcium sulfate, diatomaceous earth, lignin, agar-agar, gelatin, wheat flour, cellulose, starch or bean flour, have been added to fresh yeast which, as a rule, has a water content of about 70% by weight. Also, yeast has been subjected to thermal drying. A comprehensive summary is furnished by H. Fink and H. Wildner in "Brauwissenschaft" 1952 edition, vol. 7, pp. 120–123 and vol. 8, pp. 134–138. The addition of foreign substances to yeast, however, is undesirable and frequently not allowed by food laws.

H. Fink and H. Wildner, in "Brauwissenchaft" 1952 edition, vol. 8, pp. 138–141 and vol. 9, pp. 149–152 have also described their experiments to dry fresh yeast, one with thermal drying and one with the use of air-dried or pre-dried additions of, for example, wheat flour or potato starch with subsequent drying. As their evaluation of these experiments shows, the activating power of yeast dried in this manner decreases greatly in all cases upon extended periods of storage. From these facts it can be concluded that the vitality of yeast cells was impaired even though their cell water was extracted only partly and under the most favorable conditions.

Many varied mechanical-physical drying methods for fresh yeasts have been attempted since they do not require the addition of foreign matters and a summary of these is presented in "Die Hefen," vol. 2, "Technologie der Hefen," (Nuremberg 1962, p. 582 and the following). The resultant so-called active-dry yeasts having a moisture content of 8–10% by weight can be stored for a long period of time. However, the preparation of the presently known active-dry yeasts according to these processes involves high operating costs and expensive installations. For example, the dehydration of fresh yeast has to be effected as carefully as possible to avoid the slightest damage to the cell walls and requires expensive machinery and a high expenditure of energy. The packaging and storing of the resulting dry yeasts is also expensive since these operations have to be effected in the presence of a protective gas such as nitrogen to delay the decomposition of the yeast containing reserve substances.

A further disadvantage occurs in the use of these dry yeasts since they have lost a considerable amount of activating power due to the partial decomposition of yeast cells and steadily increasing quantities have to be used to obtain the identical baking effect as that usually corresponding to the amount of fresh yeast. Moreover, due to their poor solubility, these dry yeasts possess a greatly retarded actuation period and, therefore, they usually have to be pre-treated by dissolving them in warm water or by pre-fermenting them in a sugar solution prior to their use. Also, the previously known dry yeasts give an unpleasant, peculiar taste to the baked goods in contrast to the fresh yeast. For these reasons, dry yeasts are entirely unsuited to be admixed with the usual air-dried ready-to-bake cake flours.

OBJECTS OF THE INVENTION

It is an object of the invention to provide a novel yeast-baking flour concentrate having high activity and prolonged stability.

It is another object to provide ready-mix cake mixes containing yeast.

It is another object of the invention to provide a novel process for the preparation of yeast-baking flour concentrates.

These and other objects and advantages of the invention will become obvious from the following detailed description.

THE INVENTION

The novel yeast-baking flour concentrate of the invention is comprised of a thoroughly admixed composition of fresh yeast and a member selected from the group consisting of pre-dried baking flour alone and pre-dried starch and pre-dried baking flour together, the said composition having an over-all moisture content of 11 to 15%. The said admixing of the ingredients is effected at room temperature without the addition of any drying agents and without subsequent heat treatments.

The yeast-baking flour concentrates can be processed into ready-to-bake cake mixes for any desired yeast pastry by the addition of additional specific ingredients. The said concentrates have dehydrated the yeast cells to a point where the activity of the yeast cells remains unimpaired and the yeast cells will not destroy themselves nor prematurely increase. In contrast to known active-dry yeasts, the activity is not maintained by reserve materials in the cells such as glycogen, trehalose or glucane which very soon leads to proteolysis and finally to complete autolysis but by nutritive substances supplied in suitable form outside the yeast, namely the flour and starch.

A preferred concentrate of the invention comprises thoroughly admixing the fresh yeast first with pre-dried starch to absorb a substantial amount of the water content of the fresh yeast and then admixing in partially or completely pre-dried baking flour to obtain the final moisture content of 11 to 15%. Evidently, the starch acts as control means between the moisture of the yeast and of the flour by enveloping the yeast. This starch envelope further guarantees the least change in the yeast cells by simultaneously protecting the yeast cells against the effect of energy-rich foodstuffs as found in ready-to-bake mixes for example.

Also, the addition of small amounts, preferably 1 to 5% by weight of the total mixture, of substances containing α- and β-amylases, preferably in malt meal form, to the pre-dried starch is often advantageous to effect a more rapid decomposition of the starch polysaccharides whereby the yeast is supplied with nutrients and a shorter activating time is attained. Other yeast nutrients such as amino acids or hydrolyzed albuminous substances in dry form can be added for the said purpose. These additives are particularly useful when the yeast-baking flour concentrate is to be used in ready-to-mix mixes which have little other energy sources for the yeast expansion as in flours for white bread and diet baked goods.

Examples of suitable pre-dried baking flours for the extraction of intra- and extra-cellular water in fresh yeast are the usual commercial grade flours suitable for baking purposes and is preferably extra-fine wheat flour. Extra-fine flour can be used alone but the concomitant use of starch is preferred. The moisture content of the pre-dried flour is less than 8% by weight, preferably about 3% by weight.

Examples of the pre-dried starches are wheat starch, corn starch, rice starch, tapioca starch, potato starch, manioka starch, etc. However, potato starch is particularly preferred. Starches can be pre-dried by known methods to any degree but for the present invention the moisture content is not more than 1% by weight, preferably less than 0.3% by weight. The starch content of the yeast-baking flour concentrate is usually between 50 to 150% by weight, preferably 100% by weight, based on the fresh yeast content to obtain maximum taste and pore structure in the final baked goods.

The ratio of fresh yeast to baking flour with or without starch is determined by the amount of moisture in the flour and starch used and the water content of the fresh yeast, but the final moisture content of the concentrate should be about 11 to 15%, which is similar to commercial flours under normal conditions.

The admixing of fresh yeast and the pre-dried flour and starch, if used, can be effected in the usual manner in any known mixing apparatus such as kneaders or siftters. Joint sifting of the components is especially simple and effects a thorough blending thereof. Also, the yeast may be converted into an aqueous, just about sprayable suspension and be sprayed into the flour or flour-starch mixture freely or slowly tumbling in the kneading device described in copending, commonly assigned U.S. patent application Ser. No. 494,731, filed Oct. 11, 1965.

The yeast-baking flour concentrates of the invention can be stored under standard conditions alone or in a ready-to-bake cake flour for several months without premature loss of rising power or even autolysis of the yeast being observed. Only when the concentrate or a ready-to-bake mix is stirred together with a baking liquid such as water or milk into a dough does the desired fermentation and rising power begin and the said activity of the yeast differs only slightly from the activity of fresh yeast and is definitely superior to known active-dry yeasts. The final baked goods are of perfect quality and excellent taste. It is completely unexpected that absolutely unchanged fresh yeast, without mechanical or heat pretreatment, can be simply worked into a concentrate for use in ready-to-bake mixes containing energy-rich nutrients in which concentrates the yeast cells apparently derive their food supply from the flour and/or starch surrounding them without consumption of food reserves in the yeast cell itself.

In the following examples there are described several preferred embodiments to illustrate the invention. However, it should be understood that the invention is not to be limited to the specific embodiments.

EXAMPLE I 1 part by weight of fresh yeast having a moisture content of about 70% by weight, 1 part by weight of potato starch with a moisture content of 0.3% and 3.4 parts by weight of extra-fine wheat flour with a moisture content of 3% were thoroughly admixed through a sifter. The resulting yeast-baking flour concentrate, which had a total moisture content of 15% by weight, was stored at room temperature and at the usual relative air-moisture, that means under standard conditions.

At 4-week intervals, the mixture was used for baking tests. The baked goods obtained from each test showed no difference in quality compared with those baked goods which had been prepared with fresh concentrate of the same baking flour even when the baking process was conducted after 7 months of storage.

EXAMPLE II

In a mixing device with a kneading action, 1 kg. of fresh yeast having a moisture content of about 70% by weight, was admixed first with 1 kg. of rice starch with a moisture content of 0.6% to which 2% by weight of malt meal had been added, and then with 4 kg. of fine wheat flour with a moisture content of 3.4%. The concentrate of yeast-baking flour had a total moisture content of 14% by weight. As described in Example I, the concentrate was stored and used for baking tests and in addition to comparable satisfactory results of Example I, shortening of the rising period was observed, which obviously was attributed to the addition of the malt meal.

EXAMPLE III 1 kg. of fresh yeast with a moisture content of about 70% by weight was admixed with a 6.5 kg. of wheat flour with a moisture content of 3% in a kneading-action device to obtain a baking-flour-concentrate with a total moisture content of 12% by weight. The said baking-flour-yeast concentrate proved also to be storable without losing any of its rising action in the baking tests of Example I.

Various modifications of the compositions and method of the invention may be made without departing from the spirit or scope thereof.

We claim:
1. A process for the preparation of a yeast-baking flour concentrate consisting essentially of thoroughly admixing fresh yeast with a sufficient amount of a member selected from the group consisting of pre-dried baking flour alone and pre-dried starch and pre-dried baking flour, the moisture content of said flour being less than 8% by weight and the moisture content of said starch being not more than 1% by weight, to obtain a final moisture content of 11 to 15% in the concentrate without the addition of drying agents and without subsequent heat treatment whereby the activity of the yeast cells remains unimpaired and the cells will not destroy themselves or prematurely increase.

2. The process of claim 1 wherein small amounts of at least one member selected from the group consisting of yeast nutrients and starch-degrading enzymes are present in the concentrate.

3. Process of claim 1 wherein the moisture content of said pre-dried starch is less than 0.3% by weight and the moisture content of said pre-dried baking flour is about 3% by weight.

4. The process of claim 1 wherein the concentrate also contains a small amount of malt meal.

5. Process of claim 1 wherein said fresh yeast is first admixed with said pre-dried starch and then with said pre-dried baking flour; the moisture content of said pre-dried starch is not more than 1% by weight and the moisture content of said pre-dried baking flour is less than 8% by weight.

6. The process of claim 5 wherein the starch content is about 50 to 100% by weight based on the fresh yeast.

7. The process of claim 5 wherein the starch content is about 50% by weight based on the fresh yeast.

References Cited

UNITED STATES PATENTS

| | | | |
|---|---|---|---|
| 3,231,389 | 1/1966 | Cooper et al. | 99—94 |
| 3,278,312 | 10/1966 | Griffon et al. | 99—96 |
| 3,378,377 | 4/1968 | Griffon et al. | 99—96 |

RAYMOND N. JONES, Primary Examiner

U.S. Cl. X.R.

99—96